United States Patent
Sato

(10) Patent No.: US 10,294,994 B2
(45) Date of Patent: May 21, 2019

(54) MACHINE COMPONENT COMPOSED OF METAL AND RUBBER AND MANUFACTURING METHOD OF THE SAME

(71) Applicant: NAKANISHI METAL WORKS CO., LTD., Osaka-shi (JP)

(72) Inventor: Takahiko Sato, Osaka (JP)

(73) Assignee: NAKANISHI METAL WORKS CO., LTD., Osaka-shi (JP)

(*) Notice: Subject to any disclaimer, the term of this patent is extended or adjusted under 35 U.S.C. 154(b) by 241 days.

(21) Appl. No.: 14/789,047

(22) Filed: Jul. 1, 2015

(65) Prior Publication Data

US 2017/0089394 A1   Mar. 30, 2017

(30) Foreign Application Priority Data

Jul. 9, 2014   (JP) .................................. 2014-141040

(51) Int. Cl.
   *F16C 33/72*   (2006.01)
   *B60B 27/00*   (2006.01)
   (Continued)

(52) U.S. Cl.
   CPC .............. *F16C 33/723* (2013.01); *B32B 7/12* (2013.01); *B32B 15/06* (2013.01); *B32B 15/18* (2013.01);
   (Continued)

(58) Field of Classification Search
   CPC .. B32B 15/06; B32B 7/04; B32B 7/12; Y10T 428/31692; Y10T 428/31699;
   (Continued)

(56) References Cited

U.S. PATENT DOCUMENTS 4,818,620 A * 4/1989 Pilkington ........... F16J 15/3228
                                                        428/465
8,146,930 B2 * 4/2012 Sicilia .................... F16C 33/723
                                                        277/635
(Continued)

FOREIGN PATENT DOCUMENTS

JP   2002347123 A  * 12/2002
JP   2011-84265 A1    4/2011
(Continued)

OTHER PUBLICATIONS

Machine translation (Espacenet) of JP 2002-347123 A. Translated Feb. 9, 2018. (Year: 2018).*

(Continued)

*Primary Examiner* — Maria V Ewald
*Assistant Examiner* — Ethan A. Utt
(74) *Attorney, Agent, or Firm* — Kratz, Quintos & Hanson, LLP

(57) ABSTRACT

The present invention is intended to provide a machine component composed of metal and rubber that results in no increase of material costs for an adhesive or increase of manufacturing costs for metal molding, causes no contamination of the metal mold or generates no foreign matter on the metal mold due to adhesion of the adhesive at the time of molding, causes no failure by separation of the adhesive from a fitting portion at the time of fitting the metal component, and is clean and favorable in appearance. A machine component 1 composed of metal and rubber is formed by applying a thermoset resin adhesive A to a surface of a metal component 2 of a predetermined shape, and vulcanizing and adhering a rubber 3 of a predetermined shape to part of the surface of the metal component 2 by metal molding.

1 Claim, 6 Drawing Sheets

(51) Int. Cl.

| | |
|---|---|
| *F16C 33/78* | (2006.01) |
| *B32B 15/06* | (2006.01) |
| *B32B 7/12* | (2006.01) |
| *B32B 15/18* | (2006.01) |
| *B60B 7/00* | (2006.01) |
| *C09K 3/10* | (2006.01) |
| *C08J 3/24* | (2006.01) |
| *C09J 5/06* | (2006.01) |
| *C09J 171/08* | (2006.01) |
| *C09J 183/00* | (2006.01) |
| *F16C 19/18* | (2006.01) |

(52) U.S. Cl.
CPC ............ *B60B 7/0013* (2013.01); *B60B 27/00* (2013.01); *C08J 3/247* (2013.01); *C09J 5/06* (2013.01); *C09J 171/08* (2013.01); *C09J 183/00* (2013.01); *C09K 3/10* (2013.01); *C09K 3/1006* (2013.01); *F16C 19/185* (2013.01); *F16C 33/7833* (2013.01); *B32B 2250/02* (2013.01); *B32B 2255/06* (2013.01); *B32B 2255/26* (2013.01); *B32B 2581/00* (2013.01); *B60B 2310/204* (2013.01); *B60B 2310/318* (2013.01); *B60B 2360/348* (2013.01); *B60B 2360/50* (2013.01); *C08J 2319/00* (2013.01); *C09J 2415/008* (2013.01); *C09K 2003/1068* (2013.01); *C09K 2200/0607* (2013.01); *F16C 19/186* (2013.01); *F16C 2326/02* (2013.01)

(58) Field of Classification Search
CPC ....... Y10T 428/31707; Y10T 428/2848; Y10T 428/2804; F16C 33/72; F16C 33/723; F16C 33/00; F16C 33/76; F16C 33/768; F16C 2240/40; F16C 2240/70; F16C 33/7816; F16C 33/782; F16C 33/7823; F16C 33/783; F16C 33/7833; F16C 33/78; B60B 27/00; B60B 27/0005; B60B 27/001; B60B 27/0068; B60B 27/0073
USPC ............... 428/463, 461, 465, 450, 354, 344; 384/477, 489
See application file for complete search history.

(56) References Cited

U.S. PATENT DOCUMENTS

| | | | | |
|---|---|---|---|---|
| 8,382,377 | B2* | 2/2013 | Yamamoto | F16C 33/723 384/448 |
| 8,534,922 | B2* | 9/2013 | Takada | F16C 33/723 384/489 |
| 8,690,449 | B2* | 4/2014 | Seki | F16C 33/723 384/489 |
| 8,915,649 | B2* | 12/2014 | Seki | F16C 33/723 384/448 |
| 9,476,735 | B2* | 10/2016 | Ito | G01P 3/487 |
| 9,752,898 | B2* | 9/2017 | Taki | G01D 5/2006 |
| 10,005,318 | B2* | 6/2018 | Komai | F16C 33/723 |
| 2010/0054644 | A1* | 3/2010 | Takada | F16C 33/723 384/477 |
| 2011/0181101 | A1* | 7/2011 | Sicilia | F16C 33/723 384/489 |
| 2011/0254356 | A1* | 10/2011 | Yamamoto | F16C 33/723 301/109 |
| 2012/0177312 | A1* | 7/2012 | Aritake | F16C 33/723 384/446 |
| 2013/0195389 | A1* | 8/2013 | Seki | F16C 33/723 384/446 |
| 2014/0010487 | A1* | 1/2014 | Seki | F16C 33/723 384/446 |
| 2015/0117806 | A1* | 4/2015 | Ito | G01P 3/487 384/448 |
| 2015/0354988 | A1* | 12/2015 | Fukuda | G01D 5/20 324/207.25 |
| 2015/0354989 | A1* | 12/2015 | Taki | G01D 5/2006 324/207.25 |
| 2016/0059627 | A1* | 3/2016 | Komai | F16C 33/723 384/446 |
| 2017/0326914 | A1* | 11/2017 | Komai | F16C 33/723 |

FOREIGN PATENT DOCUMENTS

| | | | |
|---|---|---|---|
| JP | 5355987 B2 | 11/2013 | |
| WO | WO-2012070555 A1 * | 5/2012 | ......... B60B 27/0073 |

OTHER PUBLICATIONS

Machine translation (Google Patents) of WO 201/070555 A1. Translated Dec. 17, 2018. (Year: 2018).*

* cited by examiner

MACHINE COMPONENT COMPOSED OF METAL AND RUBBER AND MANUFACTURING METHOD OF THE SAME

TECHNICAL FIELD

The present invention relates to a machine component that is formed by vulcanizing and adhering rubber to part of a surface of a metal component by metal molding.

BACKGROUND ART

There is a cup-shaped protective cover provided with hermeticity by a vulcanized and adhered rubber seal (seal member or elastic member) that is pushed into an outer ring of a bearing to cover an axial magnetic encoder and intervene between the magnetic encoder and a sensor, as a machine component composed of metal and rubber formed by applying a thermoset resin adhesive to the surface of a metal component of a predetermined shape and vulcanizing and adhering a rubber of a predetermined shape to part of the surface of the metal component by metal molding (for example, refer to Patent Documents 1 and 2).

In such a protective cover, the metal component as a main body is formed by pressing a non-magnetic, highly corrosion-resistant stainless steel plate material, for example.

The application of the adhesive to the surface of the main body after pressing into the cup shape is generally performed by immersing the main body into the liquid-state adhesive retained in a bath.

CITATION LIST

Patent Literatures

Patent Document 1: JP-A No. 2011-84265
Patent Document 2: Japanese Patent No. 5355987

SUMMARY OF INVENTION

Technical Problem

When the application of the adhesive is performed by such an immerse process, a large number of metal components can be processed simultaneously. However, the adhesive is applied to the entire surface of the metal component including unnecessary portions. In addition, such an immerse process increases the wastage rate of the adhesive because the adhesive needs to be shaken off or replaced, which results in a large amount of waste adhesive and cost increase of adhesive material.

In addition, since the adhesive is applied to the entire surface of the metal component, when the rubber of a predetermined shape is vulcanized and adhered to the surface of the metal component by metal molding, there arises a problem that the rubber material is likely to be vulcanized and adhered beyond a predetermined range of rubber adhesion. To keep the vulcanization and adhesion of the rubber within the predetermined range, the metal mold structure needs to be complicated and raised in accuracy with increase of manufacturing costs.

Further, at the time of metal molding, the adhesive may stick to the metal mold to contaminate the metal mold and generate foreign matter on the metal mold.

Furthermore, when the metal component is pushed into the outer ring of the bearing, the adhesive may separate from the fitting portion and bite into the rubber seal to deteriorate airtightness or may remain as foreign matter in the bearing.

Moreover, the adhesive is adhered to the entire surface of the metal component and the appearance is not clear or favorable.

In view of the foregoing circumstances, an object of the present invention is to provide a machine component composed of metal and rubber that results in no increase of material costs for the adhesive or increase of manufacturing costs for metal molding, causes no contamination of the metal mold or generates no foreign matter on the metal mold due to adhesion of the adhesive at the time of molding, causes no failure by separation of the adhesive from a fitting portion at the time of fitting the metal component, and is clean and favorable in appearance, and a manufacturing method of the machine component.

Solution to Problem

To solve the foregoing problems, the machine component composed of metal and rubber according to the present invention is a machine component composed of metal and rubber that is formed by applying a thermoset resin adhesive to a surface of a metal component of a predetermined shape, and vulcanizing and adhering a rubber of a predetermined shape to part of the surface of the metal component by metal molding, wherein the range of the adhesive applied to the surface of the metal component before the metal molding covers only a joint surface relative to the rubber.

According to this configuration, the range of the adhesive applied to the surface of the metal component covers only the joint surface relative to the rubber, that is, the adhesive is not applied to portions other than a predetermined range of the rubber to be adhered. This results in a very small amount of waste adhesive without increase of material costs for the adhesive.

In addition, since the range of the adhesive applied to the surface of the metal component covers only the joint surface relative to the rubber, there occurs no failure that the rubber material is vulcanized and adhered beyond the predetermined range of the rubber to be adhered. This eliminates the need for a complicated and high-accuracy metal mold structure, which suppresses increase of manufacturing costs at metal molding. In addition, this configuration can be used for all of vulcanizing production systems with a high degree of flexibility in manufacture.

Further, since the range of the adhesive applied to the surface of the metal component covers only the joint surface relative to the rubber, the adhesive does not stick to the metal mold to contaminate the metal mold or generate foreign matter on the metal mold at the time of metal molding.

Moreover, since the range of the adhesive applied to the surface of the metal component covers only the joint surface relative to the rubber, the adhesive does not exist on the surface of the metal component to be visually checked. Accordingly, the finished product is clear and favorable in appearance and is improved in commodity value.

It is preferred that the machine component composed of metal and rubber is a protective cover for a bearing device, and a seal as the rubber is vulcanized and adhered to the outer peripheral surface of a cup-shaped stainless-steel main body as the metal component.

According to this configuration, the foregoing operations and advantages can be produced at the protective cover for bearing device. In addition, when the main body is pushed into the outer ring of the bearing, there occurs no situation in which the adhesive separates from the fitting portion and bites into the rubber seal to cause airtightness failure or the separated adhesive remains as foreign matter in the bearing.

To solve the foregoing problems, the manufacturing method of a machine component composed of metal and rubber according to the present invention is a manufacturing method of a machine component composed of metal and rubber including: an adhesive application step of applying a thermoset resin adhesive to a surface of a metal component of a predetermined shape; and a metal molding step of vulcanizing and adhering a rubber of a predetermined shape to part of the surface of the metal component, wherein, at the adhesive application step, the adhesive is applied to only a joint surface of the metal component relative to the rubber.

According to this manufacturing method, the range of the adhesive applied to the surface of the metal component at the adhesive application step covers only the joint surface relative to the rubber, that is, the adhesive is not applied to portions other than a predetermined range of the rubber to be adhered. This results in a very small amount of waste adhesive without increase of material costs for the adhesive.

In addition, since the range of the adhesive applied to the surface of the metal component covers only the joint surface relative to the rubber, there occurs no failure that the rubber material is vulcanized and adhered beyond the predetermined range of the rubber to be adhered. This eliminates the need for a complicated and high-accuracy metal mold structure, which suppresses increase of manufacturing costs at metal molding.

Further, since the range of the adhesive applied to the surface of the metal component covers only the joint surface relative to the rubber, the adhesive does not stick to the metal mold to contaminate the metal mold or generate foreign matter on the metal mold at the time of metal molding.

Moreover, in the machine component composed of metal and rubber manufactured by this manufacturing method, since the range of the adhesive applied to the surface of the metal component covers only the joint surface relative to the rubber, the adhesive does not exist on the surface of the metal component to be visually checked. Accordingly, the finished product is clear and favorable in appearance and is improved in commodity value.

It is preferred that the application of the adhesive to the metal component at the adhesive application step is performed by a pad printing process in which the adhesive is transferred to the metal component by pressing a pad as a transfer body with the adhesive in a predetermined region against the metal component, a screen printing process in which the adhesive on a screen plate with pores in a predetermined region is transferred to the metal component by extruding the adhesive through the pores, a brushing process, or a masking and spraying process.

According to this manufacturing method, it is possible to perform stably and reliably the application of the adhesive at the adhesive application step such that the adhesive is applied only to the joint surface of the metal component relative to the rubber and no adhesive is applied to the portions other than the joint surface.

Advantageous Effects of Invention

According to the machine component composed of metal and rubber and the manufacturing method of the same in the present invention as described above, the following significant advantages can be produced:

(A) According to this configuration, the range of the adhesive applied to the surface of the metal component covers only the joint surface relative to the rubber, that is, the adhesive is not applied to portions other than the predetermined range of the rubber to be adhered. This results in a very small amount of waste adhesive without increase of material costs for the adhesive.

(B) Since the range of the adhesive applied to the surface of the metal component covers only the joint surface relative to the rubber, there occurs no failure that the rubber material is vulcanized and adhered beyond the predetermined range of the rubber to be adhered. This eliminates the need for a complicated and high-accuracy metal mold structure, which suppresses increase of manufacturing costs at metal molding. In addition, this configuration can be used for all of vulcanizing production systems with a high degree of flexibility in manufacture.

(C) Since the range of the adhesive applied to the surface of the metal component covers only the joint surface relative to the rubber, the adhesive does not stick to the metal mold to contaminate the metal mold or generate foreign matter on the metal mold at the time of metal molding.

(D) Since the range of the adhesive applied to the surface of the metal component covers only the joint surface relative to the rubber, when the metal component is fitted, there occurs no failure resulting from the separation of the adhesive from the fitting portion; and (E) Since the range of the adhesive applied to the surface of the metal component covers only the joint surface relative to the rubber, the adhesive does not exist on the surface of the metal component to be visually checked. Accordingly, the finished product is clear and favorable in appearance and is improved in commodity value.

BRIEF DESCRIPTION OF DRAWINGS

FIG. 4(a) illustrates a stainless-steel main body to which an adhesive is applied; and FIG. 4(b) illustrates a protective cover manufacturing by vulcanizing and adhering a rubber seal to the stainless-steel main body by metal molding;

FIG. 8(a) is a plane view and FIG. 8(b) is a vertical cross-sectional view.

DESCRIPTION OF EMBODIMENTS

First Embodiment

Figure 1:
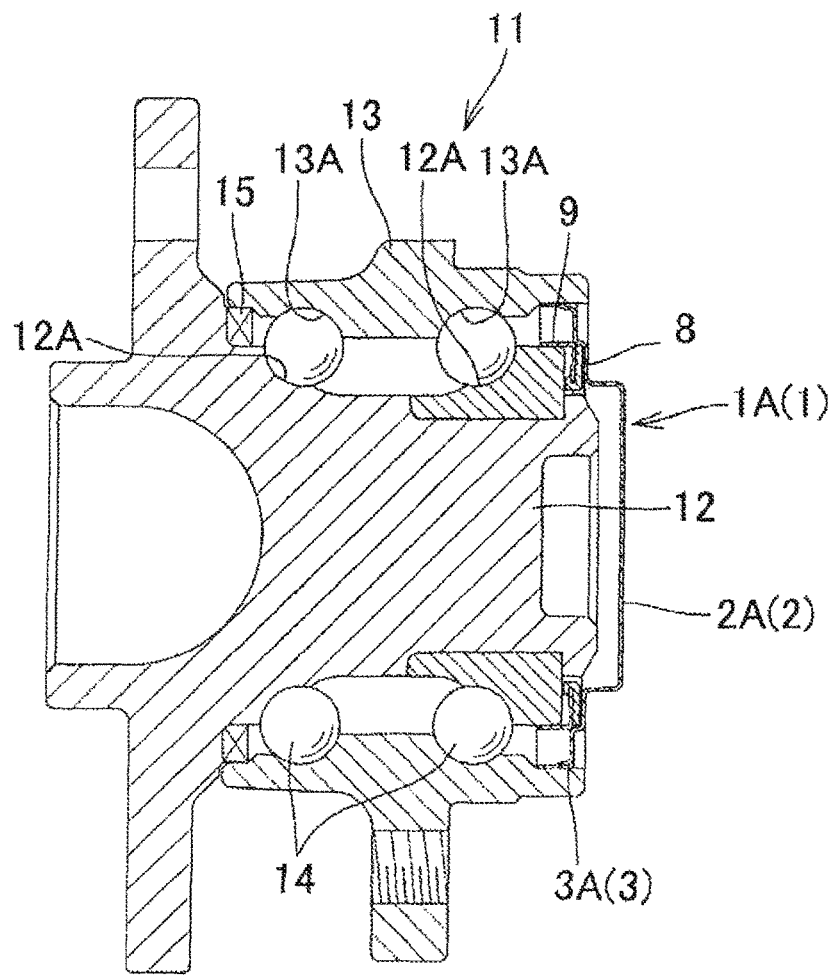
FIG. 1 is a vertical cross-sectional view of a bearing device with a protective cover as a machine component composed of metal and rubber according to a first embodiment of the present invention.
Figure 2:
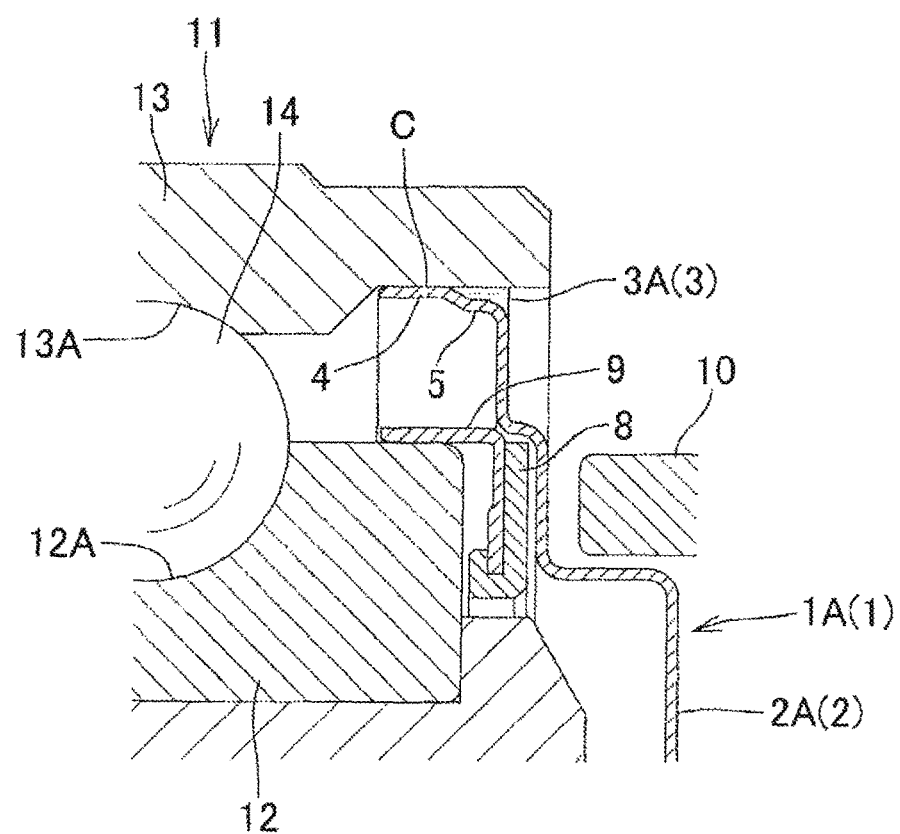
FIG. 2 is an enlarged vertical cross-sectional view of main parts of the same.

As illustrated in the vertical cross-sectional view of FIG. 1 and the enlarged vertical cross-sectional view of main parts of FIG. 2, a bearing device 11 with a protective cover 1A as a machine component 1 composed of metal and rubber according to a first embodiment of the present invention, includes: a bearing having an inner ring 12 with an inner ring track surface 12A on an outer peripheral surface, an outer ring 13 with an outer ring track surface 13A on an inner peripheral surface, and rolling elements 14, 14, . . . rolling between the inner ring track surface 12A and the outer ring track surface 13A; a magnetic encoder 8 that is positioned at one axial end portion of the bearing and fixed to the inner ring 12 by a fixing member 9; a sensor 10 that is fixed to the outer ring 13 and opposed to a magnetic pole of the magnetic encoder 8 to detect rotation of the magnetic encoder 8; and a seal member 15 that is arranged at the other axial end portion of the bearing, and the like.

Figure 3:
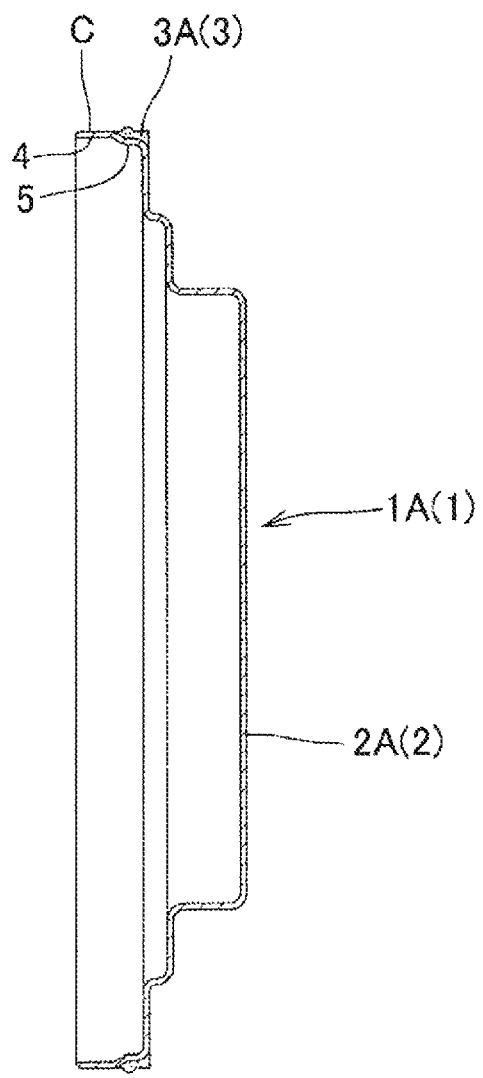
FIG. 3 is a vertical cross-sectional view of the protective cover as a machine component composed of metal and rubber according to the first embodiment of the present invention.

As illustrated in the enlarged vertical cross-sectional view of main parts of FIG. 2 and the vertical cross-sectional view of FIG. 3, in the protective cover 1A, a first cylindrical part 4 and a second cylindrical part 5 smaller in diameter than the first cylindrical part 4 and connected to an end edge of the first cylindrical part 4 are provided at a maximum outer diameter part of a main body 2A as a machine component 2, and a seal 3A as a rubber 3 is vulcanized and adhered to the outer peripheral surface of the second cylindrical part 5.

In the protective cover 1A, a fitting portion C as the outer peripheral surface of the first cylindrical part 4 is pushed into the outer ring 13 to cover the magnetic encoder 8 and intervene between the magnetic encoder 8 and the sensor 10.

Accordingly, the inside of the bearing is sealed by the protective cover 1 having the seal 3A and the seal member 15 at the axial both end portions of the bearing. The magnetic encoder 8 is accommodated in the inner space of the bearing to protect the magnetic encoder 8 and the interior of the bearing from foreign matter and the like.

The main body 2A of the protective cover 1A is formed by pressing a stainless steel plate material such as SUS304 into a cup shape to include the first cylindrical part 4, the second cylindrical part 5, and the like.

The seal 3A as the rubber 3 may be one of oil-resistant rubber materials such as nitrile rubber (NBR), hydrogenated nitrile rubber (HNBR), acrylic rubber (ACM), ethylene-acrylic rubber (AEM), fluorine rubber (FKM, FPM), and silicon rubber (VQM), or a blend of two or more of the same.

Next, an adhesive application step of applying a thermoset resin adhesive to the surface of the stainless steel main body 2A as the metal component 2 will be described.

First, the thermoset resin adhesive may be any of general rubber vulcanizing adhesives such as a phenolic resin adhesive and a silane adhesive.

For example, in the case of using a phenolic resin adhesive, although there is no particular limitation on its composition, the resin adhesive may be formed by dissolving a novolac-type phenolic resin, a resol-type phenolic resin, and a hardening agent such as hexamethylenetetramine in methanol or methylethylketone. For increasing adhesiveness, a novolac-type epoxy resin may be mixed into the foregoing adhesive.

Figure 4A:
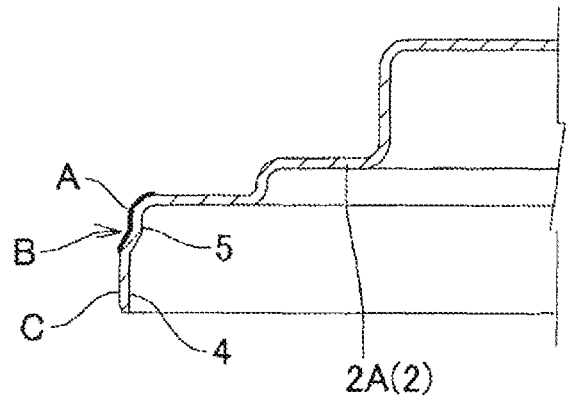
FIG. 4(a) and FIG. 4(b) are enlarged vertical cross-sectional views of main parts.

As illustrated in the enlarged vertical cross-sectional view of main parts of FIG. 4(a), the range of application of a thermoset resin adhesive A to the surface of the stainless steel main body 2A covers only a joint surface B as a predetermined range in which the seal 3A as the rubber 3 is adhered. The adhesive A is not applied to portions other than the joint surface B.

The application of the adhesive A to the predetermined range (joint surface B) of part of the surface of the main body 2A can be performed by a pad printing process in which a pad as a transfer body with the adhesive A in a predetermined region is pressed against the main body 2A, a screen printing process in which the adhesive A on a screen plate with pores in a predetermined region is extruded through the pores to transfer the adhesive A to the main body 2A, a brushing process, or a masking and spraying process.

According to the foregoing application method, it is possible to perform an application work in a stable and reliable manner such that the adhesive A is applied to only the joint surface B of the main body 2A as the metal component 2 relative to the seal 3A as the rubber 3, and the adhesive A is not applied to portions other than the joint surface B.

Figure 4B:
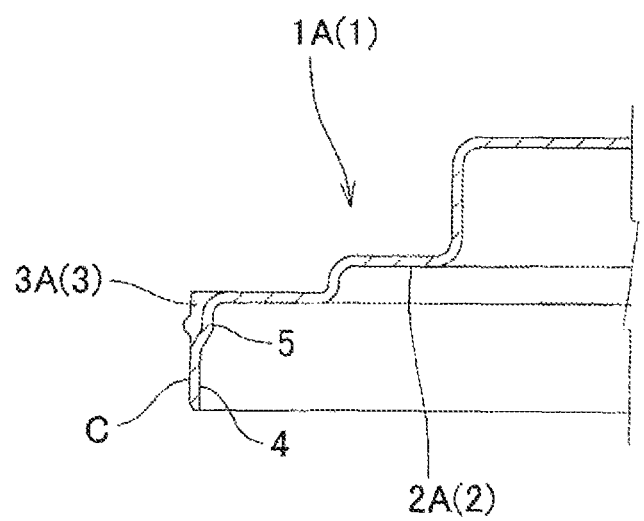

Next, descriptions will be given as to a metal molding step of vulcanizing and adhering the seal 3A as the rubber 3 of a predetermined shape to the main body 2A as the metal component 2 to which the adhesive A is applied as illustrated in FIG. 4(a), thereby to manufacture the protective cover 1A as the machine component 1 composed of metal and rubber illustrated in the enlarged vertical cross-sectional view of FIG. 4(b).

Figure 5:
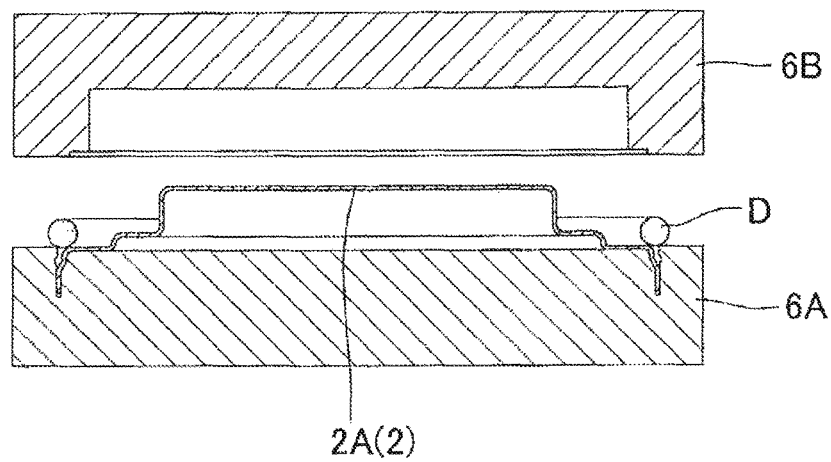
FIG. 5 is a vertical cross-sectional view illustrating an example of metal molding in the case of direct-pressure molding (compression (vulcanizing) molding)

Such metal molding can be performed by direct-pressure molding (compression (vulcanizing) molding) by which, in the state where the main body 2A is set in a heated lower metal mold part 6A, an upper metal mold part 6B is closed and a raw rubber material D is pressed and hardened as illustrated in the vertical cross-sectional view of FIG. 5.

Figure 6:
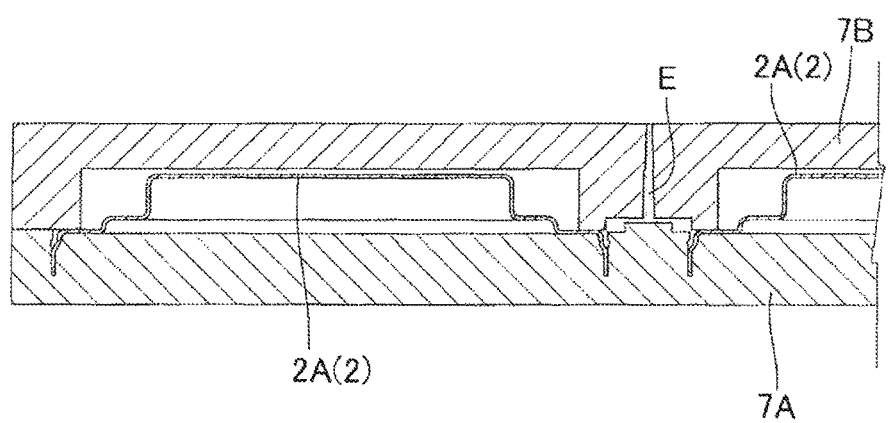
FIG. 6 is a vertical cross-sectional view illustrating an example of metal molding in the case of injection (vulcanizing) molding.

Alternatively, as illustrated in the vertical cross-sectional view of FIG. 6, the metal molding may be performed by injection (vulcanizing) molding by which, in the state where the main bodies 2A, 2A, . . . are set in a lower metal mold part 7A and an upper metal mold part 7B is closed, a liquefied raw rubber material E is charged into cavities.

In the example 1 described above, the bearing device 11 to which the protective cover 1A is to be attached includes the magnetic encoder 8. However, the protective cover 1A is also usable for a bearing device without the magnetic encoder 8.

Second Embodiment

Figure 7:
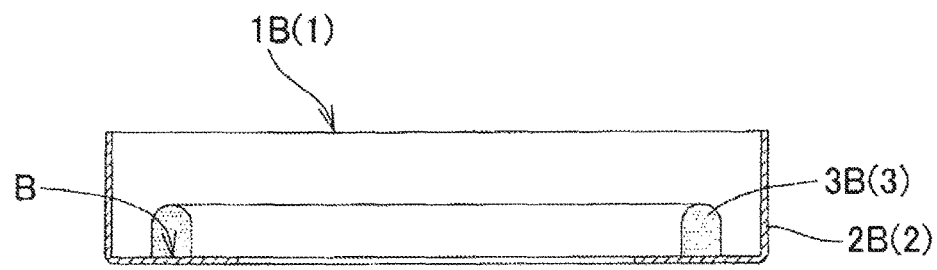
FIG. 7 is a vertical cross-sectional view of a damper component as a machine component composed of metal and rubber according to a second embodiment of the present invention.

As illustrated in the vertical cross-sectional view of FIG. 7, a damper component 1B as the machine component 1 composed of metal and rubber according to a second embodiment of the present invention is formed by vulcanizing and adhering a damper 3B as the rubber 3 of a predetermined shape to a metal fitting 2B as the metal component 2.

In the damper component 1B, at the same adhesive application step as that in the first embodiment, the adhesive is applied to only a joint surface B of the metal fitting 2B relative to the damper 3B, and at the same metal molding step as that in the first embodiment, the damper 3B is vulcanized and adhered to the metal fitting 2B.

Third Embodiment

Figure 8A:
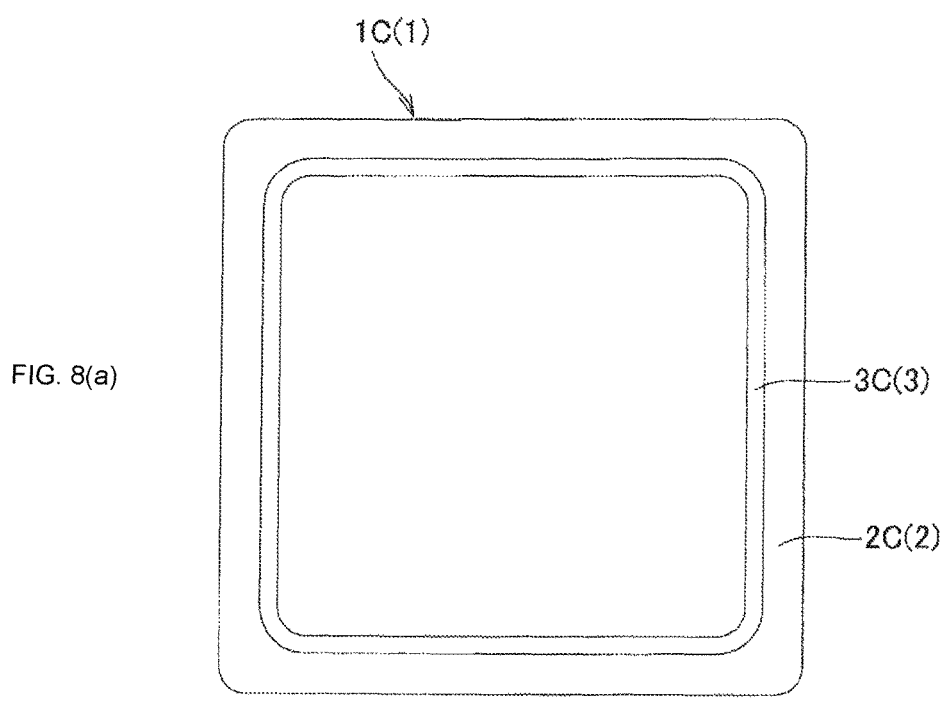
FIG. 8(a) and FIG. 8(b) illustrate a rubber packing-equipped plate as a machine component composed of metal and rubber according to a third embodiment of the present invention.
Figure 8B:
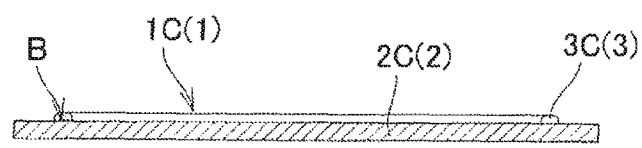

As illustrated in the vertical cross-sectional views of FIG. 8(a) and FIG. 8(b), a rubber packing-equipped plate 1C as the machine component 1 composed of metal and rubber according to a third embodiment of the present invention is formed by vulcanizing and adhering a packing 3C as the rubber 3 of a predetermined shape to a metal plate 2C as the metal component 2.

In the rubber packing-equipped plate 1C, at the same adhesive application step as that in the first embodiment, the adhesive is applied to only a joint surface B of the metal plate 2C relative to the packing 3C, and at the same metal molding step as that in the first embodiment, the packing 3C is vulcanized and adhered to the metal plate 2C.

Applicable objects in the present invention are not limited to the protective cover 1A, the damper component 1B, and the rubber packing-equipped plate 1C in the foregoing embodiments but the present invention is also applicable to all kinds of metal components 1 composed of metal and rubber formed by applying the thermoset resin adhesive A to the surface of the metal component 2 of a predetermined shape, and vulcanizing and adhering the rubber 3 of a predetermined shape to part of the surface of the metal component 2 by metal molding.

According to the machine component 1 composed of metal and rubber and the manufacturing method of the same as described above, since the range of the adhesive A applied to the surface of the metal component 2 covers only the joint surface B relative to the rubber 3, the adhesive A is not applied to portions other than the predetermined range of the rubber 3 to be adhered. This results in a very small amount of waste adhesive A without increase of material costs for the adhesive A.

In addition, since the range of the adhesive A applied to the surface of the metal component 2 covers only the joint surface B relative to the rubber 3, there occurs no failure that the rubber material is vulcanized and adhered beyond the predetermined range of the rubber 3 to be adhered. This eliminates the need for a complicated and high-accuracy metal mold structure, which suppresses increase of manufacturing costs at metal molding. In addition, this configuration can be used for all of vulcanizing production systems with a high degree of flexibility in manufacture.

Further, since the range of the adhesive A applied to the surface of the metal component 2 covers only the joint surface B relative to the rubber 3, the adhesive A does not stick to the metal mold to contaminate the metal mold or generate foreign matter on the metal mold at the time of molding.

Furthermore, since the range of the adhesive A applied to the surface of the metal component 2 covers only the joint surface B relative to the rubber 3, when the metal component 2 is fitted, there occurs no failure resulting from the separation of the adhesive A from the fitting portion C. For example, in the case where the machine component 1 composed of metal and rubber is the protective cover 1A, when the main body 2A is pushed into the outer ring 13 of the bearing, there occurs no situation in which the adhesive A separates from the fitting portion C and bites into the rubber seal 3A to cause airtightness failure or the separated adhesive A remains as foreign matter in the bearing.

Moreover, since the range of the adhesive A applied to the surface of the metal component 2 covers only the joint surface relative to the rubber 3, the adhesive A does not exist on the surface of the metal component 2 to be visually checked. Accordingly, the finished product is clear and favorable in appearance and is improved in commodity value.

REFERENCE SIGNS LIST

A Thermoset resin adhesive
B Joint surface
C Fitting portion
D Raw rubber material
E Liquefied raw rubber material
1 Machine component composed of metal and rubber
1A Protective cover
1B Damper component
1C Rubber packing-equipped plate
2 Metal component
2A Stainless steel main body
2B Metal fitting
2C Metal plate
3 Rubber
3A Seal
3B Damper
3C Packing
4 First cylindrical part
5 Second cylindrical part
6A, 7A Lower metal mold part
6B, 7B Upper metal mold part
8 Magnetic encoder
9 Fixing member
10 Sensor
11 Bearing device
12 Inner ring
12A Inner ring track surface
13 Outer ring
13A Outer ring track surface
14 Rolling element
15 Seal member

The invention claimed is:

1. A protective cover for a bearing device, the protective cover being a machine component composed of metal and rubber, wherein the machine component is formed by applying a thermoset resin adhesive to a surface of a metal component of a predetermined shape, and vulcanizing and adhering a rubber of a predetermined shape to part of the surface of the metal component by metal molding, the protective cover comprising:

a seal as the rubber, which is vulcanized and adhered to an outer peripheral surface of a cup-shaped stainless-steel main body as the metal component;

wherein the metal component comprises;

at a maximum outer diameter part of the main body, a first cylindrical part;

a second cylindrical part that is smaller in diameter than the first cylindrical part and is connected to an end edge of the first cylindrical part;

a first disc part that is substantially perpendicular to the first cylindrical part;

a third cylindrical part that is smaller in diameter than the second cylindrical part and is connected to an end edge of the first disc part;

a second disc part that is substantially perpendicular to the first cylindrical part; and a fourth cylindrical part that is smaller in diameter than the third cylindrical part and is connected to an end edge of the second disc part;

wherein the first disc part is disposed between the second cylindrical part and the third cylindrical part, the second disc part is disposed between the third cylindrical part and the fourth cylindrical part, the seal is in contact with at least the second cylindrical part, the seal does not cover the first disc part, the first cylindrical part has an outer peripheral surface that is to be pushed into an outer ring of the bearing device, and a range of the thermoset resin adhesive applied to the surface of the metal component before the metal molding covers only a joint surface relative to the seal.

* * * * *